United States Patent [19]
Chari et al.

[11] Patent Number: 6,153,142
[45] Date of Patent: Nov. 28, 2000

[54] STEREOLITHOGRAPHIC METHOD AND APPARATUS FOR PRODUCTION OF THREE DIMENSIONAL OBJECTS WITH ENHANCED THERMAL CONTROL OF THE BUILD ENVIRONMENT

[75] Inventors: Arvind Chari, West Hills, Calif.;
Joseph F. Schoelen, Hillsboro, Oreg.;
Raymond J. Bishop, Santa Clarita, Calif.

[73] Assignee: 3D Systems, Inc., Valencia, Calif.

[21] Appl. No.: 09/247,113

[22] Filed: Feb. 8, 1999

[51] Int. Cl.[7] .................. B29C 35/08; B29C 41/02
[52] U.S. Cl. .................. 264/401; 264/40.6; 264/308; 264/406; 264/409; 264/410
[58] Field of Search .................. 264/40.6, 308, 264/401, 406, 409, 410; 425/143, 174.4, 375; 700/120

[56] References Cited
U.S. PATENT DOCUMENTS 5,427,733  6/1995  Benda et al. .................. 264/40.6 X Primary Examiner—Leo B. Tentoni
Attorney, Agent, or Firm—Ralph D'Alessandro; Dennis R. Smalley

[57] ABSTRACT

A rapid prototyping and manufacturing (e.g. stereolithography) method and apparatus for making three-dimensional objects with enhanced control of the temperature of the build environment. A modulated control signal is supplied to a heating element based on a difference between a desired build temperature and a detected temperature. The modulated signal result in the heater supplying, on average, more energy to the build chamber when the temperature difference is large and supplying, on average, less energy to the build chamber when the difference is small. The detection of the build chamber temperature may occur at one or more locations. If multiple locations are used, the detected temperatures may be averaged, or otherwise combined, to derive a single difference value that will be used to control the heater. Alternatively, the multiple detected temperatures may be used to produce multiple difference values that can in turn be used to control the quantity of heat applied directly to different locations in the build environment by either using multiple heaters or multiple controllable ducts.

12 Claims, 2 Drawing Sheets

STEREOLITHOGRAPHIC METHOD AND APPARATUS FOR PRODUCTION OF THREE DIMENSIONAL OBJECTS WITH ENHANCED THERMAL CONTROL OF THE BUILD ENVIRONMENT

FIELD OF THE INVENTION

This invention relates to the formation of three-dimensional objects using a Rapid Prototyping and Manufacturing (RP&M) technique (e.g. stereolithography). The invention more particularly relates to the formation of three-dimensional objects using improved thermal control of the building environment.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Selective Deposition Modeling, and (3) Laminated Object Manufacturing.

The stereolithography class of technologies create three-dimensional objects based on the successive formation of layers of a fluid-like material adjacent to previously formed layers of material and the selective solidification of those layers according to cross-sectional data representing successive slices of the three-dimensional object in order to form and adhere laminae (i.e. solidified layers). One specific stereolithography technology is known simply as stereolithography and uses a liquid material that is selectively solidified by exposing it to prescribed stimulation. The liquid material is typically a photopolymer and the prescribed stimulation is typically visible or ultraviolet electromagnetic radiation. The radiation is typically produced by a laser through other sources of radiation are possible such as arc lamps, resistive lamps, and the like. Exposure may occur by scanning a beam or by controlling a flood exposure by use of a light valve that selectively transmits or reflects the radiation. Liquid-based stereolithography is disclosed in various patents, applications, and publications of which a number are briefly described in the Related Applications section hereafter.

Another stereolithography technology is known as Selective Laser Sintering (SLS). SLS is based on the selective solidification of layers of a powdered material by exposing the layers to infrared electromagnetic radiation to sinter or fuse the powder particles. SLS is described in U.S. Pat. No. 4,863,538, issued Sep. 5, 1989, to Deckard. A third technology is known as Three Dimensional Printing (3DP). 3DP is based on the selective solidification of layers of a powdered material which are solidified by the selective deposition of a binder thereon. 3DP is described in U.S. Pat. No. 5,204,055, issued Apr. 20, 1993, to Sachs.

The present invention is primarily directed to stereolithography using liquid-based building materials (i.e. medium). It is believed, however, that the techniques of the present invention may have application in the other stereolithography technologies for the purposes of maintaining more uniform building environments.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329, issued Jun. 9, 1992, to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607, published May 2, 1996, by Brown; WO 96-12608, published May 2, 1996, by Brown; WO 96-12609, published May 2, 1996, by Menhennett; and WO 96-12610, published May 2, 1996, by Menhennett. A third technique is called Multijet Modeling, MJM, and involves the selective deposition of droplets of material from multiple ink jet orifices to speed the building process. MJM is described in U.S. Pat. No. 5,943,235 issued to Earl et al. on Aug. 24, 1996 and U.S. patent application Ser. No. 08/722,335, filed Sep. 27, 1996, by Leyden et al. now abandoned (both assigned to 3D Systems, Inc. as is the instant application).

Though, as noted above, the techniques of the instant invention are directed primarily to liquid-based stereolithography object formation, it is believed that the techniques may have application in the SDM technologies to maintain more uniform building environments.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. Nos. 4,752,352, issued Jun. 21, 1988, to Feygin, 5,015,312, issued May 14, 1991, to Kinzie, and 5,192,559, issued Mar. 9, 1993, to Hull et al.; and in PCT Publication No. WO 95-18009, published Jul. 6, 1995, by Morita.

Various techniques for maintaining build temperature have been proposed. In particular various techniques have been described in European patent publication 376 571 B, published Feb. 8, 1995, by Takano et al. This publication describes the use of induction heating to heat the resin held in a vessel to a desired temperature, where the control of the heater is based on a detected temperature of the resin.

Even in view of the teachings of the above noted reference, a need remains in the art for improved techniques for controlling the temperature of the build environment.

2. Other Related Patents and Applications

The patents, applications, and publications mentioned above and hereafter are all incorporated by reference herein as if set forth in full. Table 1 provides a listing of patents and applications co-owned by the assignee of the instant application. A brief description of subject matter found in each patent and application is included in the table to aid the reader in finding specific types of teachings. It is not intended that the incorporation of subject matter be limited to those topics specifically indicated, but instead the incorporation is to include all subject matter found in these applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patents and Applications

| U.S. Pat. No. Issue Date Application No. Filing Date | Inventor | Subject |
|---|---|---|
| 4,575,330 Mar 11, 1986 06/638,905 Aug 8, 1984 | Hull | Discloses fundamental elements of stereo-lithography. |
| 4,999,143 Mar 12, 1991 07/182,801 Apr 18, 1988 | Hull, et al. | Discloses various removable support structures applicable to stereolithography. |
| 5,058,988 Oct 22, 1991 07/268,816 Nov 8, 1988 | Spence | Discloses the application of beam profiling techniques useful in stereolithography for determining cure depth and scanning velocity, etc. |
| 5,059,021 Oct 22, 1991 07/268,907 Nov 8, 1988 | Spence, et al. | Discloses the utilization of drift correction techniques for eliminating errors in beam positioning resulting from instabilities in the beam scanning system |
| 5,076,974 Dec 31, 1991 07/268,429 Nov 8, 1988 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| 5,104,592 Apr 14, 1992 07/339,246 Apr 17, 1989 | Hull | Discloses various techniques for reducing distortion, and particularly curl type distortion, in objects being formed by stereolithography. |
| 5,123,734 Jun 23, 1992 07/268,837 Nov 8, 1988 | Spence, et al. | Discloses techniques for calibrating a scanning system. In particular techniques for mapping from rotational mirror coordinates to planar target surface coordinates are disclosed |
| 5,133,987 Jul 28, 1992 07/427,885 Oct 27, 1989 | Spence, et al. | Discloses the use of a stationary mirror located on an optical path between the scanning mirrors and the target surface to fold the optical path in a stereolithography system. |
| 5,141,680 Aug 25 1992 07/592,599 Oct 4, 1990 | Almquist, et al. | Discloses various techniques for selectively dispensing a material to build up three-dimensional objects. |
| 5,143,663 Sep 1, 1992 07/365,444 Jun 12, 1989 | Leyden, et al. | Discloses a combined stereolithography system for building and cleaning objects. |
| 5,174,931 Dec 29, 1992 07/515,479 Apr 27, 1990 | Almquist, et al. | Discloses various doctor blade configurations for use in forming coatings of medium adjacent to previously solidified laminae. |
| 5,182,056 Jan 26, 1993 07/429,911 Oct 27, 1989 | Spence, et al. | Discloses the use of multiple wavelengths in the exposure of a stereolithographic medium. |
| 5,182,715 Jan 26, 1993 07/824,819 Jan 22, 1992 | Vorgitch, et al. | Discloses various elements of a large stereolithographic system. |
| 5,184,307 Feb 2, 1993 07/331,644 Mar 31, 1989 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,192,469 Mar 9, 1993 07/606,802 Oct 30, 1990 | Hull, et al. | Discloses various techniques for forming three-dimensional object from sheet material by selectively cutting out and adhering laminae. |
| 5,209,878 May 11, 1993 07/605,979 Oct 30, 1990 | Smalley, et al. | Discloses various techniques for reducing surface discontinuities between successive cross-sections resulting from a layer-by-layer building technique. Disclosed techniques include use of fill layers and meniscus smoothing. |
| 5,234,636 Aug 10, 1993 07/929,463 Aug 13, 1992 | Hull, et al. | Discloses techniques for reducing surface discontinuities by coating a formed object with a material, heating the material to cause it to become flowable, and allowing surface tension to smooth the coating over the object surface. |
| 5,238,639 Aug 24, 1993 07/939,549 Mar 31, 1992 | Vinson, et al. | Discloses a technique for minimizing curl distortion by balancing upward curl to downward curl. |
| 5,256,340 Oct 26, 1993 07/906,207 Jun 25, 1992 and 08/766,956 Dec 16, 1996 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| 5,321,622 Jun 14, 1994 07/606,191 Oct 30, 1990 | Snead, et al. | Discloses a computer program known as CSlice which is used to convert three-dimensional object data into cross-sectional data. Disclosed techniques include the use of various Boolean operations in stereolithography. |
| 5,597,520 Jan 28, 1997 08/233,027 Apr 25, 1994 and 08/428,951 Apr 25, 1995 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335 Sep 27, 1996 | Thayer, et al. | Discloses build and support styles for use in a Multi-Jet Modeling selective deposition modeling system. |
| 5,943,235 Aug 24, 1999 08/722,326 Sep 27, 1996 | Earl, et al. | Discloses data manipulation and system control techniques for use in a Multi-Jet Modeling selective deposition modeling system. |
| 5,902,537 May 11, 1999 09/790,005 Jan 28, 1997 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter rotating roller recoater, and 6) a technique for deriving sweep extents. |
| 5,840,239 Nov 24, 1998 08/792,347 Jan 31, 1997 | Partanen, et al. | Discloses the application of solid-state lasers to stereolithography. Discloses the use of a pulsed radiation source for solidifying layers of building material and in particular the ability to limit pulse firing locations to only selected target locations on a surface of the medium. |
| 6,001,297 Dec 14, 1999 08/847,855 Apr 28, 1997 | Partanen, et al. | Discloses the stereolithographic formation of objects using a pulsed radiation source where pulsing occurs at selected positions on the surface of a building material. |
| 08/855,125 May 13, 1997 | Nguyen, et al. | Discloses techniques for interpolating originally supplied cross-sectional data descriptive of a three-dimensional object to produce modified data descriptive of the three-dimensional object including data descriptive |

TABLE 1-continued

Related Patents and Applications

| U.S. Pat. No. Issue Date Application No. Filing Date | Inventor | Subject |
|---|---|---|
| 5,945,058 Aug 31, 1999 08/854,950 May 13, 1997 | Manners, et al. | of intermediate regions between the originally supplied cross-sections of data. Discloses techniques for identifying features of partially formed objects. Identifiable features include trapped volumes, effective trapped volumes, and solid features of a specified size. The identified regions can be used in automatically specifying recoating parameters and or exposure parameters. |
| 5,902,538 May 11, 1999 08/920,428 Aug 29, 1997 | Kruger, et al. | Discloses simplified techniques for making high-resolution objects utilizing low-resolution materials that are limited by their inability to reliably form coatings of a desired thickness due to a Minimum Recoating Depth (MRD) limitation. Data manipulation techniques define layers as primary or secondary. Recoating techniques are described which can be used when the thickness between consecutive layers is less than a leading edge bulge phenomena. |
| 09/061,796 Apr 16, 1998 | Wu, et al. | Discloses use of frequency converted solid state lasers in stereolithography. |
| 09/154,967 Sep 17, 1998 | Nguyen, et al. | Discloses techniques for stereolithographic recoating using a sweeping recoating device that pause and/or slows down over laminae that are being coated over. |
| 09/484,984 filed Jan 18, 2000 | Earl, et al. | Entitled "Method and Apparatus for Forming Three-Dimensional Objects Using Line Width Compensation with Small Feature Retention." Discloses techniques for forming objects while compensating for solidification width induced in a building material by a beam of prescribed stimulation. |
| 09/246,504 Feb 8, 1999 | Guertin, et al. | Entitled "Method and Apparatus for Stereolithographically Forming Three Dimensional Objects With Reduced Distortion." Discloses techniques for forming objects wherein a delay is made to occur between successive exposures of a selected region of a layer. |
| 09/248,352 Feb 8, 1999 | Manners, et al. | Entitled "Stereolithographic Method and Apparatus for Production of Three Dimensional Object Using Multiple Beams of Different Diameters." Discloses stereolithographic techniques for forming objects using multiple sized beams including data manipulation techniques for determining which portions of lamina may be formed with a larger beam and which should be formed using a smaller beam. |
| 09/248,351 Feb 8, 1999 | Nguyen, et al. | Entitled "Stereolithographic Method and Apparatus for Production of Three Dimensional Objects Using Recoating Parameters for Groups of Layers." Discloses improved techniques for managing recoating parameters when forming objects using layer thicknesses smaller than a minimum recoating depth (MRD) and treating some non-consecutive layers as primary layers and treating intermediate layers there between as secondary layers. |
| 09/426,416 Feb 8, 1999 | Bishop, et al. | Entitled "Rapid Prototyping Apparatus with Enhanced Thermal and Vibrational Stability for Production of Three Dimensional Objects." Discloses an improved Stereolithographic apparatus structure for isolating vibration and/or extraneous heat producing components from other thermal and vibration sensitive components. |
| 09/247,120 Feb 8, 1999 | Everett, et al. | Entitled "Stereolithographic Method and Apparatus for production of Three Dimensional Objects Including Enhanced Control of Prescribed Stimulation Production." Discloses techniques forming objects using varying production of prescribed stimulation (e.g. UV radiation) and enhanced scanning control. Production is reduced or eliminated during non-exposure periods (e.g. recoating, z-wait, and pre-dip delay). Production is set to a desired level based on the type of exposure that is desired. Scanning speed is set based on a number of criteria. Transition between successive exposure vectors may be made with multiple intervening non-exposure vectors. The laser power is set using an AOM in combination with a temporary detection of beam power. |
| 09/427,119 Feb 8 ,1999 | Kulkarni, et al. | Entitled "Stereolithographic Method and Apparatus for Production of Three Dimensional Objects Including Simplified Build Preparation." Discloses techniques for forming objects using a simplified data preparation process. Selection of the various parameter styles needed to form an object is reduced to answering several questions from lists of possible choices. |

The following two books are also incorporated by reference herein as if set forth in full: (1) *Rapid Prototyping and Manufacturing: Fundamentals of Stereolithography,* by Paul F. Jacobs; published by the *Society of Manufacturing Engineers,* Dearborn Mich.; 1992; and (2) *Stereolithography and other RP&M Technologies: from Rapid Prototyping to Rapid Tooling;* by Paul F. Jacobs; published by the *Society of Manufacturing Engineers,* Dearborn Mich.; 1996.

SUMMARY OF THE INVENTION

It is an object of the present invention to provide improved control of process chamber (i.e. build chamber) temperature.

A first aspect of the invention is to provide a method of forming a three-dimensional object from a plurality of adhered laminae by exposing successive layers of a material to prescribed stimulation, including (1) providing a build environment in which to form the three-dimensional object; (2) sensing the actual temperature of the build environment at at least one location during formulation of the object; (3) deriving a difference between the actual temperature and a desired temperature; (4) operating a heating element to apply a heat to the build environment in proportion to the difference so as to substantially maintain the build environment within a predefined temperature range; (5) forming a layer of material adjacent to any last formed layer of material in preparation for forming a subsequent lamina of the object; (6) exposing the material to the prescribed stimulation to form a successive lamina of the object; and (7) repeating the acts of forming and exposing a plurality of times to form the object from a plurality of adhered laminae.

A second aspect of the invention is to provide an apparatus for forming a three-dimensional object from a plurality of adhered laminae by exposing successive layers of a material to prescribed stimulation, including: (1) a build environment in which to form the three-dimensional object; (2) a sensor for sensing the actual temperature of the build environment at at least one location during formation of the object; (3) a device for deriving a difference between the actual temperature and a desired temperature; (4) a heating system, comprising a heating element and a control element for causing the heating element to apply heat to the build environment in proportion to the difference so as to substantially maintain the build environment within a predefined temperature range; (5) a coating system for forming a layer of material adjacent to any last formed layer of material in preparation for forming a subsequent lamina of the object; (6) an exposure system for selectively applying prescribed stimulation to the material to form a successive lamina of the object; and (7) a computer programmed to operate the coating system and the exposure system to form the object from a plurality of adhered laminae.

A third aspect of the invention is to provide a method of forming a three-dimensional object from a plurality of adhered laminae, including: (1) providing a build environment in which to form the three-dimensional object; (2) sensing the actual temperature of the build environment at at least one location during formation of the object; (3) deriving a difference between the actual temperature and a desired temperature; (4) operating a heating element to apply a heat to the build environment in proportion to the difference so as to substantially maintain the build environment within a predefined temperature range; (5) forming a lamina of the object adjacent to and adhered to any previously formed lamina; and (6) repeating the act of forming a plurality of times to form the object from a adhered laminae.

A fourth aspect of the invention is to provide an apparatus for forming a three-dimensional object from a plurality of adhered laminae, including: a build environment in which to form the three-dimensional object; (2) a sensor for sensing the actual temperature of the build environment at at least one location during formation of the object; (3) a device for deriving a difference between the actual temperature and a desired temperature; (4) a heating system, comprising a heating element and a control element for causing the heating element to apply heat to the build environment in proportion to the difference so as to substantially maintain the build environment within a predefined temperature range; (5) means for forming a lamina of the object adhered to any previously formed lamina; and (6) means for repeatedly operating the means for forming a plurality of times in order to form the object from a plurality of adhered laminae.

Additional aspects of the invention will be clear from the embodiments of the invention described below in conjunction with the Figures associated therewith. Further aspects of invention involve the practice of the above referred to aspects of the invention in combination with one other.

DESCRIPTION OF PREFERRED EMBODIMENTS OF THE INVENTION

Figure 1A:
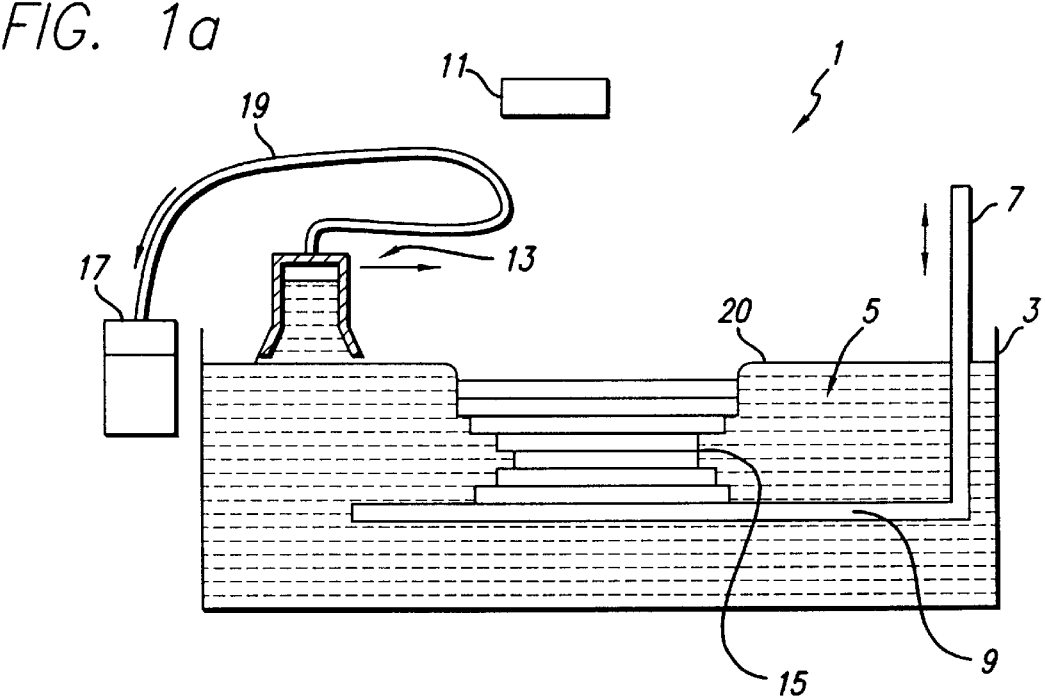
FIGS. 1a and 1b depict side views of a stereolithography apparatus for practicing the instant invention.
Figure 1B:
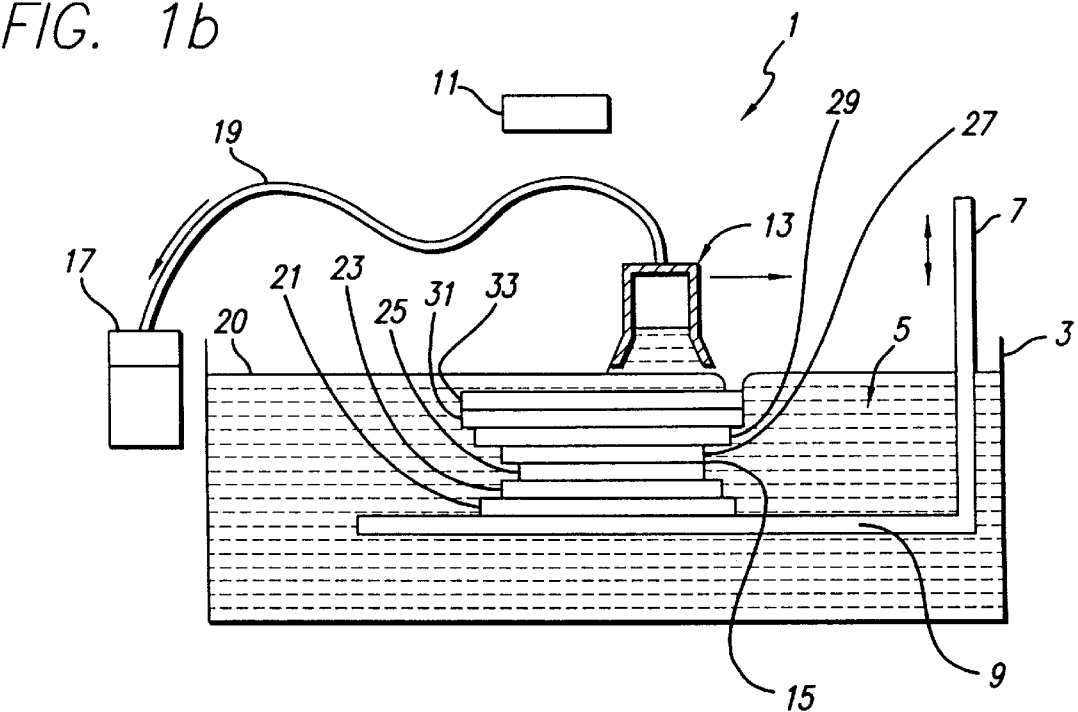

FIGS. 1a and 1b depict schematic representations of a preferred stereolithography apparatus 1 (SLA) for use with the instant invention. The basic components of an SLA are described in U.S. Pat. Nos. 4,575,330; 5,184,307; and 5,182, 715 as referenced above. The preferred SLA includes container 3 for holding building material 5 (e.g. photopolymer) from which object 15 will be formed, elevator 7 and driving means (not shown), elevator platform 9, exposure system 11, recoating bar 13 and driving means (not shown), at least one computer (not shown) for manipulating object data (as needed) and for controlling the exposure system, elevator, and recoating device. The exposure system is used to selectively apply prescribed stimulation to the surface of the material from which the object is to be formed.

FIG. 1a depicts the partially formed object as having its most recently formed lamina lowered to a position approximately one layer thickness below the desired level of the upper surface of the building material 5 (i.e. desired working surface). As the layer thickness is small and the building material very viscous, FIG. 1a indicates that the material has not flowed significantly across the last formed lamina even after lowering the platform 9. FIG. 1b depicts the coating bar 13 as being swept part way across the previously formed lamina and that the next layer of building material has been partially formed.

A preferred exposure system is described in several of the patents and applications referenced above including U.S. Pat. Nos. 5,058,988; 5,059,021; 5,123,734; 5,133,987; U.S. Ser. Nos. 08/792,347; 09/147,120. This preferred system includes a laser, a beam focusing system, and a pair of computer controlled XY rotatable scanning mirrors of either the motor driven or galvanometer type.

Preferred control and data manipulation systems and software are described in a number of the patents referenced above, including U.S. Pat. Nos. 5,184,307; 5,321,622; and 5,597,520.

A preferred recoating device is described in U.S. patent application Ser. No. 08/790,005 as referenced above and includes recoater bar 13, regulated vacuum pump 17, and vacuum line 19 connecting the bar 13 and the pump 17.

Other components of a preferred SLA (not shown) may include a liquid level control system, a build chamber, an environmental control system including a temperature control system, safety interlocks, a viewing device, and the like. A preferred temperature control system will be further described hereafter.

SLAs on which the instant invention may be utilized are available from 3D Systems, Inc. of Valencia, Calif. These SLAs include the SLA-250 using a CW HeCd laser operating at 325 nm, the SLA-3500, SLA-5000, and the SLA-7000 each using a solid state lasers operating at 355 nm with pulse repetition rates of 22.2 KHz, 40 KHz, and 25 KHz, respectively. Preferred building materials are photopolymers manufactured by CIBA Specialty Chemicals of Los Angeles, Calif., and are available from 3D Systems, Inc. These materials include SL 5170, SL 5190, and SL 5530HT.

The typical operation of an SLA involves alternating formation of coatings of material (i.e. layers of material) and the selective solidification of those coatings to form an object from a plurality of adhered laminae. The process may conceptually be viewed as beginning with the elevator platform 9 immersed one layer thickness below the upper surface 20 of the photopolymer 5. The coating of photopolymer is selectively exposed to prescribed stimulation (e.g. a beam of UV radiation) which cures the material to a desired depth to form an initial lamina of the object adhered to the elevator platform. This initial lamina corresponds to an initial cross-section of the object to be formed or corresponds to an initial cross-section of supports that may be used to adhere the object to the platform. After formation of this initial lamina, the elevator platform and adhered initial lamina are lowered a net amount of one layer thickness into the material.

As the material is typically very viscous and the thickness of each layer is very thin (e.g. 4 mils to 10 mils), the material may not readily form a coating over the last solidified lamina (as shown in FIG. 1a). In the case where a coating is not readily formed, a recoating device may be swept at or somewhat above the surface of the building material (e.g. liquid photopolymer) to aid in the formation of a fresh coating. The coating formation process may involve the sweeping of the recoating bar one or more times at a desired velocity.

After formation of this coating, the second layer is solidified by a second exposure of the material to prescribed stimulation according to data representing a second cross-section of the object. The process of coating formation and solidification is repeated over and over again until the object is formed from a plurality of adhered layers (21, 23, 25, 27, 29, 31, and 33).

It is preferred that objects be formed in a build chamber (sometimes referred to as a process chamber or process module) portion of an SLA. The temperature of this build chamber is preferably controlled so as to maintain the building material and surrounding air at a desired temperature. The uniformity of the temperature of the environment surrounding the object during its formation (i.e. the build environment) has a direct role in the accuracy of the objects formed and possibly in the reliability of the processes used informing those objects. The preferred temperature is typically a few degrees above ambient (e.g. 28–38° C. assuming ambient is 25° C.). The desired temperature is preferably above ambient so that the actual temperature may be appropriately maintained using only a heater and natural heat loss. As an alternative, the temperature may be maintained at ambient or below where a refrigeration system and possibly a heater would be employed in the process of maintaining the temperature at the desired level.

In a first preferred embodiment a heater and fan are supplied at the rear of the build chamber behind a container for holding the building material (e.g. photopolymer). An air temperature sensor is supplied in the build chamber. The sensor is preferably located in the air within the build chamber near the surface of the building material (e.g. within five inches) but other locations may also be used. The fan is preferably operated continuously even when power is not being supplied to the heater. In an alternative, the fan may be controlled to turn on and off along with the heater or be controlled to turn on somewhat before the heater and be controlled to turn off somewhat after power is supplied to the heater. The heater is operated in an appropriate manner in response to temperature as detected by the sensor and a desired set point temperature. The heater is controlled to nominally keep the build chamber/environment temperature at a desired level. The heated air is directed to a ducting system that distributes it under the container of building material. The power supplied to the heater, and the heat produced by the heater, may be controlled in several ways. A first way operates the heater in either a full power state or an "off" state and obtains an average desired power output by modulating a duty cycle. That is by modulating the period of "on" time as a portion of total time (i.e. "on" time divided by the total of "on" time pulse "off" time). A second way supplies power on a continuous basis but only at a desired level that is somewhere between 0% of maximum power and 100% of maximum power.

According to a preferred embodiment of the invention, when the temperature is detected to be below the desired set point the heater is turned on. The heater, however, may not be maintained in the "on" state for the entire duration of time that the detected temperature is too low. As the actual temperature nears the set point temperature, "on" and "off" cycling occurs based on a criteria that sets the time average of power supplied to the heater based on the difference between the actual temperature and the desired temperature levels.

Figure 2:
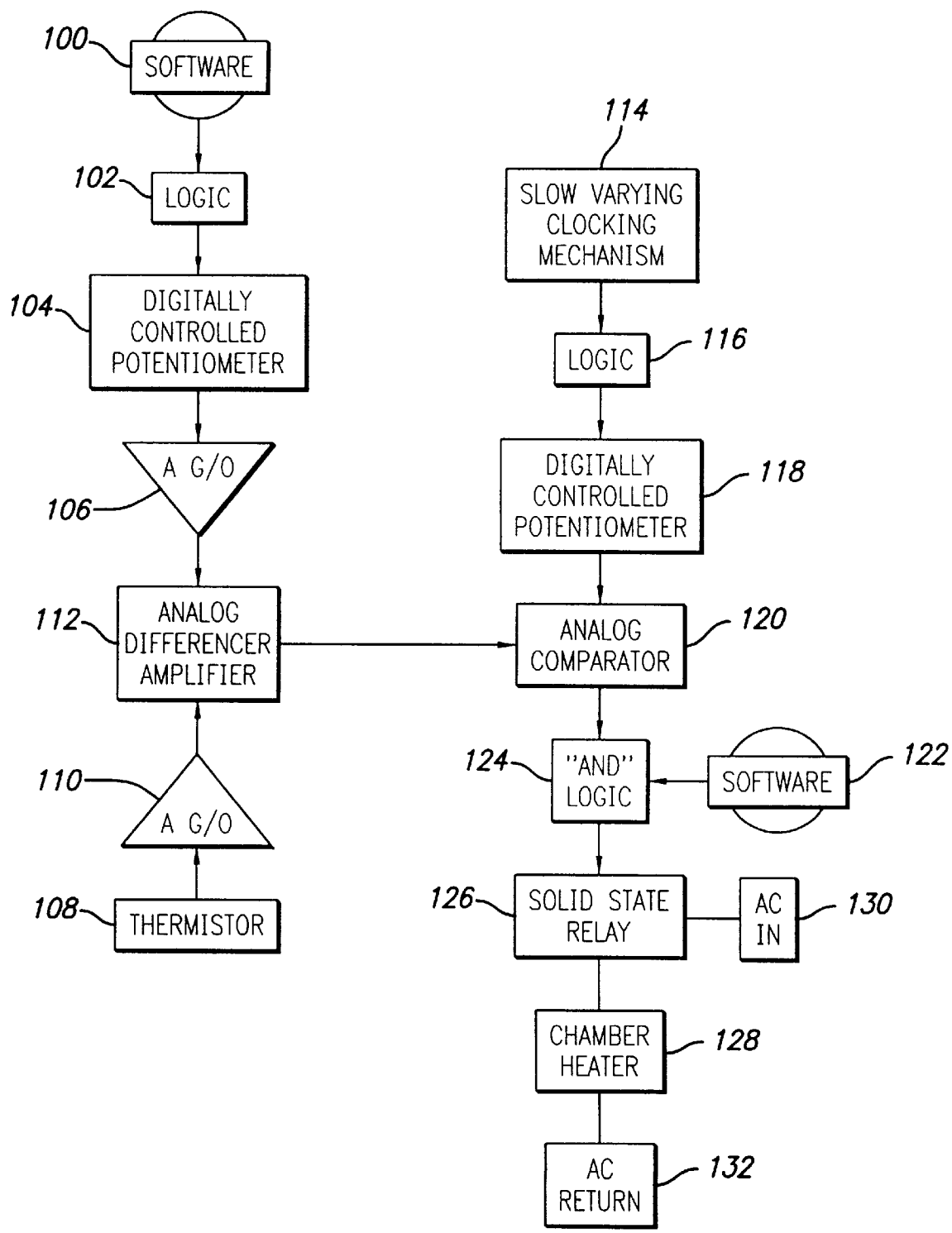
FIG. 2 depicts a block diagram of the temperature control system of a preferred embodiment.

FIG. 2 depicts a block diagram of the temperature control system of the first preferred embodiment. Software 100 and appropriate logic 102 are used to obtain a desired voltage from a digitally controlled potentiometer 104. The desired voltage is indicative of a desired chamber temperature (i.e. temperature set point). Element 106 indicates that the output from the digital potentiometer is modified to obtain an appropriate analog signal that can be used by an analog differencer amplifier 112 for comparison to the output from element 110.

Element 108 provides a sensor located in the build chamber and is used to provide an output from which the temperature in the chamber can be ascertained. A preferred sensor is a thermistor, but other sensors may be used. Element 110 modifies the output from element 108 to put it in an appropriate form for use by the analog differencer amplifier 112. The actual temperature may be sensed continuously or periodically. In the present embodiment temperature sensing is done continuously. Signals from elements 106 and 110 are provided as input to the analog differencer amplifier 112 from which an analog difference signal is generated and passed on to comparator 120. The output of amplifier 112 is indicative of the temperature difference between the set point temperature and the measured temperature. If the signal voltage is zero, the difference between set point temperature and actual temperature is zero.

Elements 114, 116, and 118 provide a slowly varying voltage to an analog comparator 120. This slowly varying voltage ramps up and down between a low value $V_L$ and a high value $V_H$ over a relatively long period (e.g. 30 seconds). This ramping signal is used to vary power control in relationship to the temperature difference derived by differencer 112. This varying voltage is obtained by a control signal being generated by a combination of a clocking mechanism 114 and appropriate logic 116. This control signal is applied to a digitally controlled potentiometer to obtain the slowly varying output voltage.

The analog comparator 120 compares a signal representing the temperature difference, derived from the differencer 112, to the slowly varying ramp voltage. If the temperature difference signal is greater than $V_H$, the comparator 120 drives the heater fully (i.e. the duty cycle is 100%). When the temperature difference is below $V_L$, or is negative, the comparator does not drive the heater at all (i.e. on time duty cycle of 0%). The temperature difference is continuously supplied to the analog comparator 120.

If the temperature difference signal is between the $V_L$ and $V_H$, the comparator output is a digital pulse width modulated signal. The signal is "more-on" when the temperature difference is closer to the maximum $V_H$ of the ramp. It is "more-off" the closer the temperature difference is to the minimum $V_L$ of the ramp. This may be conceptually understood by considering that the "on" time from the comparator is related to the percentage of time that the temperature difference signal is larger than the slowly varying ramp signal.

In the present embodiment $V_H$ is set to correspond to a temperature difference of about 0.5 to about 1.0° C. Above this difference, the comparator sends a signal for the heater to be fully on. Below this difference, modulation occurs until the difference falls below a value corresponding to $V_L$ at which point the heater remains off until $V_L$ is again exceeded. Appropriate values for $V_L$, $V_H$, and ramp period, as well as other variables may be empirically determined. The optimal values may vary based on specific characteristics of the stereolithographic system. Such characteristics may include heat loss in the system, volume of air being heated, heater power, and the like. In the first preferred embodiment, the heater power is approximately 800 watts.

The signal from the comparator is sent to logic element 124. A software enable signal is provided by element 122 and sent to logic element 124 where a Boolean "and" operation is performed on the comparator signal and the enable signal. The result of this operation is passed to a solid state relay 126 that provides electric power from 130 and 132 to chamber heater 128. The software enable signal provides an initial signal that controls when the heater may initially be turned on when the machine is first powered up. The signal then maintains the heater in an "enable" state during the rest of the time the machine is powered up. It is preferred that the solid state relay implement zero-crossing AC switching so as to minimize noise.

Many alternatives to the above embodiment are possible. Several such alternatives are discussed herein next.

In an alternative embodiment, the desired chamber temperature set point may be hard coded or set in various other manners known to those of skill in the art. The ramping function may produce linear increasing ramps and decreasing ramps or the ramping may be based on a non-linear function. The comparator may produce a linear or non-linear modulation signal when the temperature difference is between values $V_L$ and $V_H$.

The analog processing and analysis may be replaced by digital processing. The ramp generation of elements 114–118 and the comparator 120 may be replaced by a look-up table having duty cycle information and possibly time period information based on the temperature difference that has been determined.

In an alternative embodiment, the heat supplied by the heater may be supplied at a variable rate that is based on a temperature difference between the set point and an actual measured temperature but only at certain times when enabled by a modulated signal. The modulated signal may be applied using software 122 and logic 124. Alternatively, the modulated signal may be generated by hardware. This modulated signal causes the heater to be enabled only a portion of the time that the comparator provides a positive signal for the heater to be activated. For example, this additional modulation may operate with a 50% or greater duty cycle with a period of a few seconds.

In a further alternative, a variable amount of heat may be supplied without the use of any on-off modulation. Instead, a variable current may be supplied to the heater based on the temperature difference supplied by amplifier 112. This variable current may be based on a look-up table correlating output heat to input current or electrical power.

In a further alternative, the temperature may be measured at more than one location. In this alternative, the measured temperatures may be averaged or otherwise combined to yield a single value for comparison to a set point temperature. It is preferred that temperature measurements be made in the air or other atmospheric environment of the build chamber; however, in alternative embodiments the temperature of the building material or of some other solid or liquid component in the build chamber may be measured. If the temperature of the building material is measured it may be preferable to measure, it near its upper surface than its lower surface.

In a further alternative, the heat flow may be variably directed to selected locations in the build chamber based on multiple temperature measurements. This selective directing of heat flow may be implemented based on ducting and selective control of airflow through those ducts (e.g. by controlling the flow rate of one or more fans). Alternatively, selective application of heat may occur via two or more heaters located in selected portions of the build chamber.

Heat detection may occur by any well known sensing means. For example, thermocouples, thermistors, and IR detectors, thermometers, optical detection, and the like, may be used. Heat may be supplied by production of resistive heat through a current carrying component, by induction heating, by IR transfer (i.e. radiation and absorption), by heat transport by gas or liquid flow, conduction, and the like. All or a portion of the heat required for the process chamber may be supplied to the build chamber by directing heat from peripheral heat producing electrical components of the SLA such as one or more power supplies, drivers, computers, radiation generator(s), scanning devices, and the like. Peripheral heat producing components are those components of the SLA that provides some other services to the SLA operation than merely heat production.

In further alternatives, the variation in heat supplied to the building environment may be based on ranges of temperature difference. In other alternatives, the heat supplied may be provided by specification of a desired pulse width and period or based on duty cycle. In some embodiments, the heat supplied may not go completely to zero when the temperature difference goes to zero as it may be anticipated that heat loss to the outside environment will result in some continuous, but probably small, power input needs.

The proportional control of heating in the preferred embodiment provides a build environment that is substantially free of large thermal gradients that can adversely affect the stereolithographic process. The preferred proportional control implementation relies on the principle of pulse width modulation (PWM), where the active state of a control signal is time modulated in proportion to some feedback mechanism (e.g. thermistors). The PWM signal is integrated by the heating element to provide an averaged heat output to the build chamber that does not include any rapid thermal transients.

The the methods and apparatus in the above embodiment and its alternatives can be modified according to various teachings in the above incorporated patents and applications. As noted previously, it is believed that the teachings herein can be applied to other RP&M technologies in order to achieve better process control.

Though a preferred embodiment as been described and illustrated and several alternatives purposed, many additional embodiments and alternatives will be apparent to those of skill in the art upon review of the teachings herein. As such, these embodiments are not intended to limit the scope of the invention, but instead to be exemplary in nature.

We claim:

1. A method of forming a three-dimensional object from a plurality of adhered laminae by exposing successive layers of a material to prescribed stimulation, comprising:

providing a build environment in which to form the three-dimensional object; sensing the actual temperature of the build environment in at least one location during formation of the object;

deriving a difference between the actual temperature and a desired temperature;

supplying heat to the build environment via a heating element controlled by a modulated signal, the modulated signal turning the heat on and off according to a selected pulse width or duty cycle that varies in relation to the difference so as to substantially maintain the build environment within a predefined temperature range;

forming a layer of material adjacent to any last formed layer of material in preparation for forming a subsequent lamina of the object;

exposing the material to the prescribed stimulation to form a successive lamina of the object; and repeating the acts of forming and exposing to form the object from a plurality of adhered laminae.

2. The method of claim 1 wherein the heat is supplied by the heating element that is controlled in response to the temperature difference.

3. The method of claim 1 wherein at least a portion of the heat is supplied by peripheral heat producing components.

4. The method of claim 1 wherein the predefined temperature range is within 0.5° C. of a desired set point temperature.

5. The method of claim 1 wherein the variation occurs based on ranges of temperature difference.

6. The method of claim 1 wherein the pulse width and duty cycle are not zero when the difference is zero.

7. An apparatus for forming a three-dimensional object from a plurality of adhered laminae by exposing successive layers of a material to prescribed stimulation, comprising:

a build environment in which to form the three-dimensional object;

a sensor in the apparatus for sensing the actual temperature of the build environment in at least one location during formation of the object;

a device connected to the apparatus for deriving a difference between the actual temperature and a desired temperature;

a heating system connected to the apparatus, comprising a heating element and a control element for controlling the heating element to cause the heating element to apply heat to the build environment in proportion to the difference so as to substantially maintain the build environment within a predefined temperature range the control element responding to a received modulated signal and further turning the heating element on and off using a pulse width or duty cycle that varies in relation to the temperature difference;

a coating system cooperative with the apparatus in the build environment for forming a layer of material adjacent to any last formed layer of material in preparation for forming a subsequent lamina of the object;

an exposure system cooperative with the apparatus for selectively applying prescribed stimulation to the material to form a successive lamina of the object; and a computer cooperative with the apparatus programmed to operate the coating system and the exposure system to form the object from a plurality of adhered laminae.

8. The apparatus of claim 7 wherein the control element uses a pulse width or duty cycle that varies based on ranges of temperature difference.

9. The apparatus of claim 7 wherein the control element uses a pulse width and duty cycle that are not zero when the difference is zero.

10. A method of forming a three-dimensional object from a plurality of adhered laminae, comprising:

providing a build environment in which to form the three-dimensional object;

sensing the actual temperature of the build environment in at least one location during formation of the object;

deriving a difference between the actual temperature and a desired temperature;

controlling a heating element to apply heat to the build environment by use of a modulated signal that turns heat on or off according to a selected pulse width or duty cycle that varies in proportion to the difference so as to substantially maintain the build environment within a predefined temperature range;

forming a lamina of the object adjacent to and adhered to any previously formed lamina; and repeating the act of forming a plurality of times in order to form the object from a plurality of adhered laminae.

11. A stereolithography apparatus for forming a three-dimensional object from a plurality of adhered laminae, comprising:

a build environment within a build chamber in which to form the three-dimensional object;

a sensor in the apparatus for sensing the actual temperature of the build environment in at least one location during formation of the object;

a device connected to the apparatus for deriving a difference between the actual temperature and a desired temperature;

a heating system connected to the apparatus, comprising a heating element and a control element for causing the heating element to apply heat to the build environment surrounding the build object in the build chamber in proportion to the difference so as to substantially maintain the build environment within a predefined temperature range;

means cooperative with the build chamber for forming a lamina of the object adhered to any previously formed lamina; and means for repeatedly operating the means for forming a plurality of times in order to form the object from a plurality of adhered laminae in an accurate and reliable fashion.

12. A method of forming a three-dimensional object from a plurality of adhered laminae by exposing successive layers of a material to prescribed stimulation, comprising:

providing a build environment in which to form the three-dimensional object;

sensing the actual temperature of the build environment in at least one location during formation of the object;

deriving a difference between the actual temperature and a desired temperature;

supplying heat to the build environment via a heating element in relation to the difference so as to substantially maintain the build environment within a predetermined temperature range, at least a portion of the heat being supplied by peripheral heat producing components;

forming a layer of material adjacent to any last formed layer of material in preparation for forming a subsequent lamina of the object;

exposing the material to the prescribed stimulation to form a successive lamina of the object; and repeating the acts of forming and exposing to form the object from a plurality of adhered laminae.

* * * * *

UNITED STATES PATENT AND TRADEMARK OFFICE
CERTIFICATE OF CORRECTION

PATENT NO.  : 6,153,142
DATED       : November 28, 2000
INVENTOR(S) : Arvind Chari et al.

It is certified that error appears in the above-identified patent and that said Letters Patent is hereby corrected as shown below:

Title page,
Item [57], ABSTRACT, line 7, should read "modulated signal results in the ..."

Column 7,
Line 29, should read "times to form the object from a plurality of adhered laminae."
Line 51, should read "aspects of the invention in combination with one another."

Column 9,
Line 60, should read "by the total of "on" time plus "off" time). A second way"

Column 12,
Line 55, should read "illustrated and several alternatives proposed, many..."

Column 14,
Lines 55-56, should read "...environment within a predefined temperature range,..."

Signed and Sealed this

Twenty-fifth Day of December, 2001

Attest:

Attesting Officer

JAMES E. ROGAN
Director of the United States Patent and Trademark Office